United States Patent [19]

Hasegawa et al.

[11] Patent Number: 4,529,460
[45] Date of Patent: Jul. 16, 1985

[54] METHOD OF PRODUCING AN INDUSTRIAL ROBOT ARM

[75] Inventors: Junzo Hasegawa, Obu; Michinori Ando, Nagoya; Hiroshi Nakamura, Kariya, all of Japan

[73] Assignee: Kabushiki Kaisha Toyota Chuo Kenkyusho, Aichi, Japan

[21] Appl. No.: 480,352

[22] Filed: Mar. 30, 1983

[30] Foreign Application Priority Data

Apr. 5, 1982 [JP] Japan ................... 57-056370

[51] Int. Cl.³ .............................. B32B 7/08
[52] U.S. Cl. ..................... 156/92; 29/460; 156/253; 384/441; 403/266; 414/722; 414/786; 901/27
[58] Field of Search ............ 901/27, 28, 29, 50, 901/14–18; 414/722, 786, 729, 735; 403/266, 267, 265; 29/526 R, 460; 156/92; 384/441, 439

[56] References Cited

U.S. PATENT DOCUMENTS

| 3,115,373 | 12/1963 | Alexander | 384/439 |
| 4,108,699 | 8/1978 | Gennes | 156/92 |
| 4,146,339 | 3/1979 | Fleming et al. | 156/92 X |

FOREIGN PATENT DOCUMENTS

| 25323 | 2/1977 | Japan | 29/460 |
| 36657 | 3/1979 | Japan | 29/460 |

*Primary Examiner*—Robert J. Spar
*Assistant Examiner*—Donald W. Underwood
*Attorney, Agent, or Firm*—Parkhurst & Oliff

[57] ABSTRACT

To mount rotatably supporting members such as a rotary shaft to an arm body of an industrial robot arm, the former and the latter are solidly secured to each other by fastening members such as rivets after a bonding agent is applied to spaces formed between the arm body and the rotatably supporting members, whereby necessity for the stage of assembling work by the welding is eliminated, shearing forces are supported by the bonding agent and tensile forces are supported by the fastening members, so that the robot arm being high in precision and mechanical strength can be obtained.

10 Claims, 7 Drawing Figures

METHOD OF PRODUCING AN INDUSTRIAL ROBOT ARM

BACKGROUND OF THE INVENTION

1. Field of the Invention

This invention relates to an industrial robot arm secured to a base frame and receiving a driving force to be moved, and a method of producing this arm.

2. Description of the Prior Art

In general, industrial robot arms are each constructed such that a rotary shaft, a bearing and the like are welded to an arm outer plate formed into predetermined dimensions by bending, welding or the like, and reinforcing plates are secured thereto if necessary.

In order to accurately carry out the works of welding, assembling and the like by means of a mechanical hand provided at the forward end portion of this robot arm, it is necessary to hold with high accuracy the relative dimensions among the rotary shaft, the bearing, etc. secured to the arm outer plate.

Heretofore, upon correction of distortions due to welding in the robot arm after the production, a reference surface has been provided on a predetermined position of this robot arm by the grinding or the like, whereby the grinding of the outer diameters of the rotary shafts and the hole forming in the bearings are carried out.

As a result, many complicated stages of work have been required for producing the robot arm with high accuracy.

SUMMARY OF THE INVENTION

The present invention has been developed to obviate the above-described disadvantage of the prior art and has as its object, the provision of an industrial robot arm rendered of small weight and produced with high accuracy through a few stages of work and of a method of producing the same.

The industrial robot arm according to the present invention is constructed such that an arm body and rotatably supporting members such as a rotary shaft are abutted against each other through a bonding agent and fastened together by fastening means. In addition, the method of producing the robot arm according to the present invention comprises the steps of producing the arm body and the rotatably supporting members such as the rotary shaft separately of each other, mounting the arm body and the rotatably supporting members on an assembling jig in a predetermined positional arrangement, filling the bonding agent into spaces formed between the arm body and the rotatably supporting members to be solidified, and fastening together the arm body and the rotatably supporting members by fastening means penetrated through through-holes formed in the arm body and the rotatably supporting members, so that the stage of welding work can be omitted.

Description will hereunder be given of an embodiment of the present invention with reference to the drawings.

DESCRIPTION OF THE PREFERRED EMBODIMENT

Figure 1:
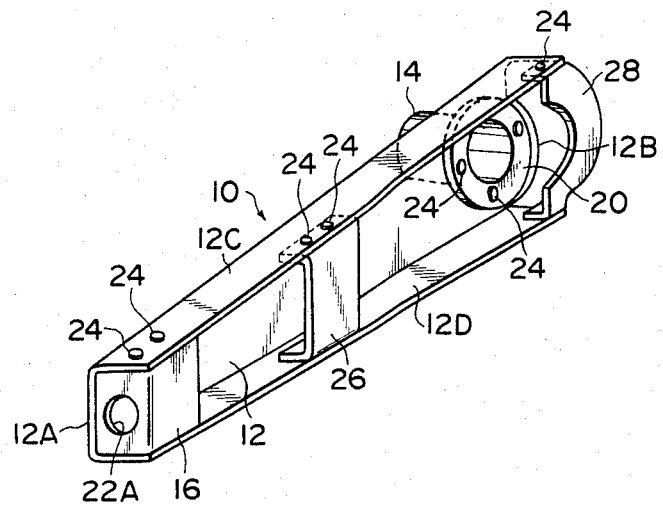
FIG. 1 is a perspective view showing an embodiment of an industrial robot arm according to the present invention.

FIG. 1 shows a robot arm 10 in the present embodiment. The essential portion of this robot arm 10 comprises an outer plate 12 as being an arm body, a rotary shaft 14 and a reinforcing frame 16.

The outer plate 12 is progressively increased in width from one end 12A to the other end 12B. Additionally, a pair of leg plates 12C and 12D are extended from both side portions in the widthwise direction of the outer plate 12 in parallel to each other along the outer plate 12. Thus, the outer plate 12 is generally formed into a U-shape in a cross section perpendicular to the longitudinal direction thereof.

Furthermore, this outer plate 12 is formed at a portion close to the other end 12B thereof with a rotary shaft mounting hole 18. The rotary shaft 14 to be inserted through this rotary shaft mounting hole 18 is previously formed into a predetermined outer shape, and provided at one end in the axial direction thereof with a collar portion 20. This collar portion 20 is adapted to contact the inner surface of the outer plate 12.

Figure 2:
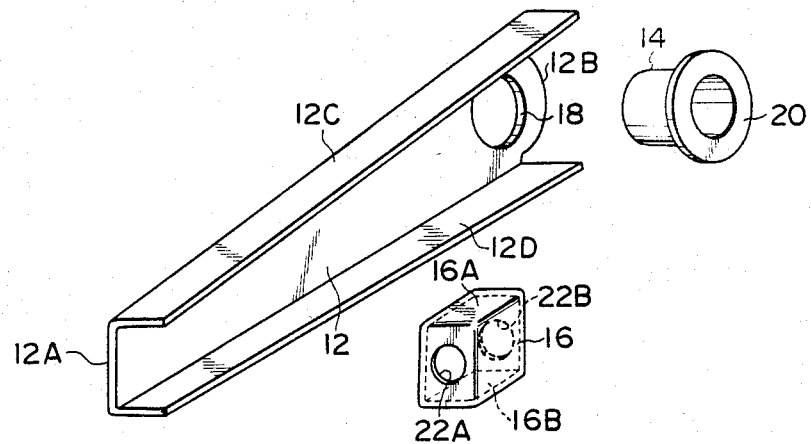
FIG. 2 is a disassembled perspective view showing the essential portions in FIG. 1.

On the other hand, the reinforcing frame 16 is formed of a thin aluminium sheet and bent into a U-shape. As shown in FIG. 2, holes 22A and 22B for receiving a wrist of a mechanical hand are coaxially formed in two opposing surfaces of the reinforcing frame 16 thus U-shaped. Further, a pair of leg plates 16A and 16B are extended from both side portions of this reinforcing frame 16, as shown in FIG. 2, and these leg plates 16A and 16B are solidly secured to the inner surfaces of the leg plates 12C and 12D of the outer plate which are opposed to the leg plates 16A and 16B.

Here, the collar portion 20 of the rotary shaft 14 and the leg plates 16A, 16B of the reinforcing frame 16 are abutted against the outer plate 12 through a bonding agent and solidly secured to the outer plate 12 by means of a plurality of rivets 24.

Furthermore, the rotary shaft 14 is adapted to be inserted through a bearing hole of a base frame, not shown, so as to rotatably support the robot arm 10 on the base frame. Solidly secured to the rotary shaft 14 is a gear, not shown, which receives a driving force from a driving gear rotatably supported on the base frame, whereby the robot arm 10 is rotated about the axis of the rotary shaft 14.

Affixed to the reinforcing frame 16 is a bearing adapted to rotatably support the wrist of the mechanical hand, not shown, which is inserted through the wrist receiving hole 22A. Further, a motor and a speed reduction gear, not shown, are solidly secured to this reinforcing frame 16. A gear solidly secured to a shaft of the wrist comes into meshing engagement with an output shaft gear of the reduction gear, so that the shaft of the wrist can be rotated in unison with the mechanical hand. In this embodiment, the shaft of the wrist thus inserted and the rotary shaft 14 have axial lines perpendicularly intersecting each other.

To increase the mechanical strength of the arm, the robot arm 10 of this embodiment is provided with a U-shaped reinforcing plate 26 connecting the leg plate 12C to the leg plate 12D at the intermediate portion in the longitudinal direction, of the outer plate 12 and a circularly arc-shaped reinforcing plate 28 connecting the leg plate 12C to the leg plate 12D at a position close to the other end 12B of the outer plate 12 as shown in FIG. 1.

Description will hereunder be given of the steps of producing the robot arm of this embodiment.

As shown in FIG. 2, the outer plate 12, the rotary shaft 14 and the reinforcing frame 16 are produced separately of one another.

Figure 3:
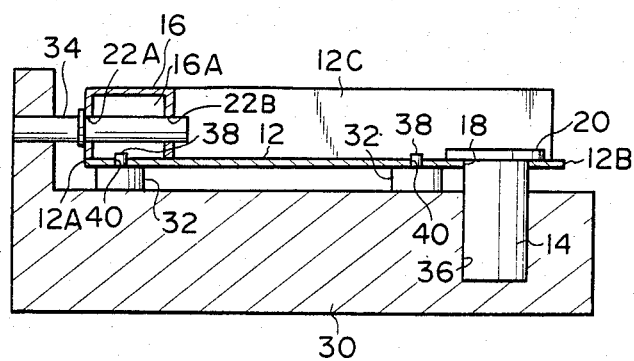
FIG. 3 is a view of an assembled state illustrating the method of producing the robot arm according to the present invention.

These parts are assembled into a unitary structure by use of an assembling jig 30 shown in FIG. 3. This assembling jig 30 is of a substantially L-shape in its side view. Solidly secured to the assembling jig 30 are support blocks 32 for supporting the outer surface of the outer plate 12 and a round rod 34 held horizontally for being inserted into the wrist receiving holes 22A and 22B. Additionally, a positioning hole 36 for being snugly fitted with the rotary shaft 14 is formed at a position close to an end portion of the assembling jig 30. Here, the axis of the round rod 34 and the axis of the positioning hole 36 constitute the positional relationship for the wrist of the mechanical hand to be secured to the wrist receiving holes 22A and 22B and the rotary shaft 14 to be secured to the rotary shaft mounting hole 18 on the design.

It is preferable that positioning pins 38 are erected from the support blocks 32, respectively. Positioning holes 40 for receiving these positioning pins 38 are formed in the outer plate 12, whereby the outer plate 12 is rested on the support blocks 32 with the positioning holes 40 being engaged with the positioning pins 38, so that the outer plate 12 can be disposed in a predetermined position with respect to the rotary shaft 14 and the reinforcing frame 16. It is preferable that the dimensions of each of the positioning pins 38, the support blocks 32 and the round rod 34 are determined such that, when the rotary shaft 14 and the reinforcing frame 16 are mounted as shown in FIG. 3, spaces of small values (which may be uniform dimensions) may be provided between the outer plate 12 and the collar portion 20 of the rotary shaft 14 and between the leg plates 12C, 12D of the outer plate 12 and the leg plates 16A, 16B of the reinforcing frame 16.

A bonding agent is filled into the spaces formed between the collar portion 20 and the outer plate 12 and between the leg plates 12C, 12D of the outer plate 12 and the leg plates 16A, 16B of the reinforcing frame 16 in a state where the outer plate 12, the rotary shaft 14 and the reinforcing frame 16 are mounted to the assembling jig 30 as described above. The bonding agent used in this embodiment is a two-part epoxy compounding resin of liquid type.

Figure 4:
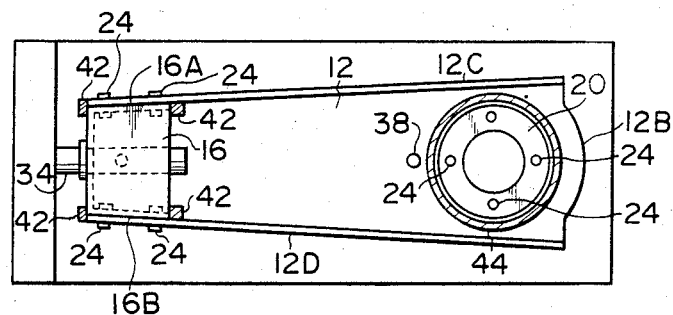
FIG. 4 is another view of an assembled state corresponding to a plan view of FIG. 3.

To prevent the bonding agent from needlessly flowing out of the portions thus filled, it is desirable to mount clay blocks 42 into the spaces formed between the end portions of the reinforcing frame 16 and the leg plates 12C, 12D as shown in FIG. 4. It is preferable that a ring-shaped clay 44 is mounted to the outer plate 12 in opposed relationship to the outer peripheral portion of the collar portion 20 for the same purpose as described above.

Upon filling of the bonding agent, one hour is allowed to solidify the bonding agent and thereafter the work of fastening the rivets 24 is carried out. More specifically, after the solidification of the bonding agent, starting holes are penetrated through between the leg plates 12C, 12D of the outer plate 12 and the leg plates 16A, 16B of the reinforcing frame 16 and between the collar portion 20 of the rotary shaft 14 and the outer plate 12 in a state where the respective parts are mounted to the assembling jig 30, and the outer plate 12 is the rotary shaft 14 and the outer plate 12 to the reinforcing frame 16 by means of the plurality of rivets 24 through the aforesaid starting holes. For the convenience in fastening, it is preferable to use such rivets 24 as being the rivets of the type capable of fastening work from only one side of the outer plate 12, e.g., the rivets capable of inserting the legs of rivets from one side of two sheets of piled plates, and enlarging the forward end portions of the legs of rivets thus inserted by a tensile force, so that the plates can be fastened to each other.

In the present embodiment, the work of fastening the rivets 24 is carried out in a state where the outer plate 12, the rotary shaft 14 and the reinforcing frame 16 are mounted to the assembling jig 30, whereby the distortions of the arm outer plate 12 which would otherwise occur during the work of fastening the rivets can be minimized, so that the rotary shaft 14 and the wrist receiving holes 22A, 22B can be improved in accuracy with each other.

Thus, the assembling of the robot arm 10 is completed. If the robot arm 10 is removed from the assembling jig 30, then there is obtained the robot arm of high precision, in which the rotary shaft 14 and the reinforcing frame 16 are arranged at a predetermined positional relationship. In consequence, if the rotary shaft 14 of this robot arm 10 is inserted into the bearing hole of the base frame, not shown, then the robot arm 15 is rotatably supported on the base frame, so that the shaft of wrist of the mechanical hand, not shown, can be rotatably supported by a bearing secured to the reinforcing frame 16. In assembling the rotary shaft 14 and the reinforcing frame 16 to the outer plate 12, the robot arm 10 of this embodiment does not need a stage of welding work, so that a stage of work for correcting the distortions which would otherwise be caused due to welding work can be eliminated. Furthermore, the parts needing no stage of welding work can be formed of thin sheet materials, thereby enabling to render the robot arm small weight.

In this robot arm 10, shearing forces acting on the interfaces of mounting between the outer plate 12 and the rotary shaft 14 and between the outer plate 12 and the reinforcing frame 16 are supported by the bonding agent, and tensile forces acting therebetween are supported by the rivets 24 being high in tensile strength, so that the robot arm having a high mechanical strength as a whole can be obtained.

The reinforcing plates 26 and 28, which would be used if necessary, are solidly affixed to the outer plate 12 by use of the bonding agent and the rivets in the same manner as the rotary shaft 14 and the reinforcing plate 16, so that the robot arm being of high precision and having high mechanical strength can be obtained.

In the above embodiment, description has been given of the robot arm wherein the rotary shaft and the reinforcing frames are secured to the outer plate as being the arm body, however, the present invention is applicable to all of the cases where the arm body is mounted thereto with the rotatably supporting members used for accurately, rotatably supporting the arm body on the base frame and/or those used for accurately, rotatably supporting the mechanical hand and another arm. Needless to say, the rivets used in the above embodiment may be replaced by fastening means such as bolts and nuts. Further, the bonding agent used in the present invention may preferably be a cold-setting adhesive such as two-part epoxy, two-part polyester, acryl group, urethane group, silicone group, polysulfide group and the like, and having a density of 1,000 to 30,000 centipoise (CP).

Figure 5:
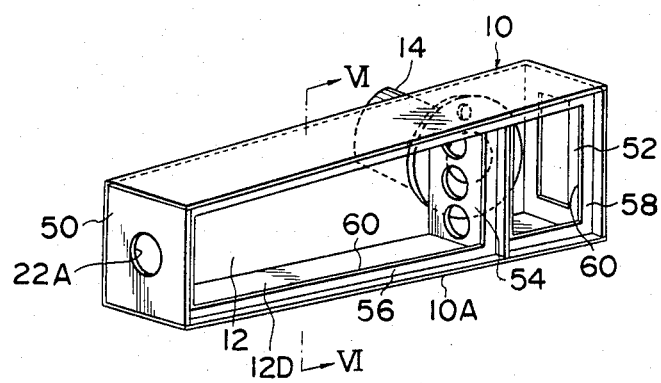
FIG. 5 is a perspective view showing a state where reinforcing plates each have therein a through-hole are secured to the robot arm.
Figure 6:
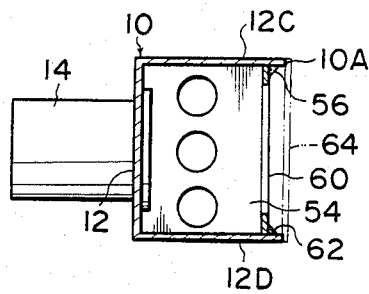
FIG. 6 is a sectional view taken along the line VI—VI in FIG. 5.

FIGS. 5 and 6 show a robot arm 10 as being a modification of the present invention. In this robot arm 10, a flat side plate 50 is secured to one end of an outer plate 12 for mounting the mechanical hand, a side plate 52 is secured to the other end of the outer plate 12, and an intermediate plate 54 disposed in parallel to the side plates 50 and 52 is solidly secured to the inner periphery of the outer plate 12 and the rotary shaft 14 at an intermediate portion in the longitudinal direction of the arm body 12, differing from the above-described embodiment. Secured to this intermediate plate 54 is a motor or the like, not shown, which can drive a mechanical hand device mounted to the side plate 50 through a drive shaft, gear and the like.

Reinforcing plates 56 and 58 are adapted to be solidly secured to the circumference of an opening of the outer plate 12.

The reinforcing plates 56 and 58 each have a thickness substantially equal to the outer plate 12, and they are solidly secured to the outer plate 12 by means of such a bonding agent as a cold-setting adhesive and/or such fastening means as rivets, as similar to the above-described embodiment, so that the welding work therefor can be eliminated.

The reinforcing plates 56 and 58 are rectangular in their shapes and each of them is provided at the central portion thereof with a rectangular through-hole 60 for insertion. In consequence, these reinforcing plates 56 and 58 are of frame shapes penetratingly provided with through-holes, leaving the marginal portions thereof, respectively.

The reinforcing plates 56 is solidly secured to the inner surfaces of the outer plate 12, the inner surface of the side plate 50 and one side of the intermediate plate 54. Further, the reinforcing plate 58 is solidly secured to the inner surface of the outer plate 12, the other side of the intermediate plate 54 and the inner surface of the side plate 52.

As shown in FIG. 6, these reinforcing plates 56 and 58 are solidly secured to positions slightly recessed towards the bottom face of the outer plate 12 inwardly from the forward end 10A of the opening of the outer plate 12, so that a bonding portion 62 can be secured when the reinforcing plates 56 and 58 are bonded to the outer plate 12.

Solidly secured to the forward end 10A of the outer plate 12 is a cover plate 64, which may otherwise be closely mounted to the reinforcing plates 56 and 58. In this case, threaded holes for receiving screws may be formed in the reinforcing plates 56 and 58.

In the robot arm 10 having the above-described arrangement, the motor, drive shaft, gear and the like can be assembled into the outer plate 12 through the through-holes 60 formed in the reinforcing plates 56 and 58, so that the assembling work of these parts can be facilitated to a great extent.

Upon completion of the assembling, the cover plate 64 is secured to the opening of the outer plate 12, so that the robot arm 10 can be brought into operation.

During operation, the robot arm 10 is subjected to bending stress and torsional stress due to the reaction force from the mechanical hand. However, the robot arm 10 is improved in mechanical strength due to the presence of the reinforcing plates 56 and 58, whereby no distortion of a great value is caused to the robot arm 10. Especially since part of the reinforcing plates 56 and 58 are solidly secured to the intermediate plate 54, the robot arm 10 can satisfactorily bear the stresses even when the central portion of the robot arm 10 tends to be subjected to bending stress and torsional stress due to the load from the mechanical hand.

During inspection and maintenance of the robot arm 10, if the cover plate 64 is removed, then a worker can easily perform the inspection and maintanance of the motor, drive shaft and the like through the through-holes 60.

Since the reinforcing plates 56 and 58 have the through-holes 60 in this embodiment, the increase in weight of the arm as a whole can be controlled within 10%, and the opening area of the opening of the outer plate 12 is decreased only by about 33%, so that the workability will not be impaired. While, the torsional rigidity of the arm is improved by about five times, and the value of distortion during movement is reduced to a great extent.

Figure 7:
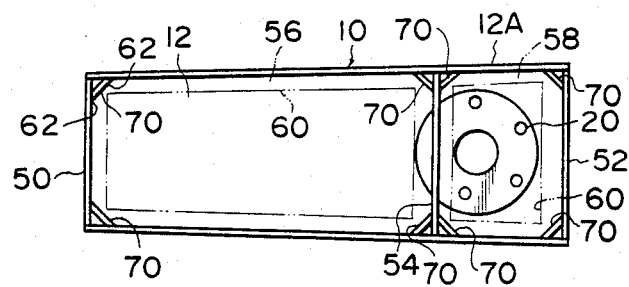
FIG. 7 is perspective view showing the state where the corner braces are secured to the robot arm.

FIG. 7 shows another modification of the arm 10.

In this embodiment, the reinforcing plates 56 and 58 are solidly secured to the opening of the outer plate 12, however, corner braces 70 are affixed between these reinforcing plates 56, 58 and the bottom face of the outer plate 12, respectively.

These corner braces 70 are racked across the cross portions between the opposing portions of the outer plate 12 and the side plates 50, 52 and between the opposing portions of the outer plate 12 and the intermediate plate 54, whereby triangular closed cross-sections are formed between the outer plate 12 and the side plates 50, 52 and between the outer plate 12 and the intermediate plate 54, so that the corner portions can be improved in mechanical strength.

These corner braces 70 can further improve the robot arm 10 in mechanical strength as compared with the preceding modification without the assembling into the outer plate 12 and the repairing work being impaired. Moreover, in solidly securing the reinforcing plates 56 and 58 to the outer plate 12, these corner braces 70 are used for positioning the reinforcing plates 56 and 58, so that the intervals between the reinforcing plates 56, 58 and the bottom face of the outer plate 12 can be made uniform, thereby enabling to improve the workability.

What is claimed is:

1. A method of producing an industrial robot arm, comprising the steps of:
    producing an arm body and rotatably supporting members such as a rotary shaft and a bearing separately of each other;
    mounting the arm body and rotatably supporting members on an assembling jig in a predetermined positional arrangement;

filling a bonding agent into spaces formed between said arm body and said rotatably supporting members;

forming through-holes in said arm body and said rotatably supporting members in a state of being secured to said assembling jig, after the solidification of said bonding agent; and solidly securing said arm body to said rotatably supporting members through said through-holes by means of fastening means.

2. A method of producing an industrial robot arm as set forth in claim 1, wherein spaces of small values may be provided between said arm body and said rotatably supporting members in a state of being secured to said assembling jig, and a bonding agent is filled into said spaces.

3. A method of producing an industrial robot arm as set forth in claim 2, wherein clay is secured to said arm body in opposed relationship to portions to which said bonding agent is applied so as to prevent said bonding agent from flowing away.

4. A method of producing an industrial robot arm as set forth in claim 1, wherein said rotatably supporting members include a rotary shaft to be inserted into a hole formed in said arm body and a bonding agent and fastening means are applied to a space formed between a collar portion of said rotary shaft and said arm body.

5. A method of producing an industrial robot arm as set forth in claim 4, wherein clay blocks are secured to said arm body in opposed relationship to the outer periphery of the collar portion of said rotary shaft so as to prevent the bonding agent from flowing away before the solidification.

6. A method of producing an industrial robot arm as set forth in claim 4, wherein the rotary shaft projecting from said arm body is inserted into a positioning hole formed in said assembling jig.

7. A method of producing an industrial robot arm as set forth in claim 1, wherein said rotatably supporting members include a reinforcing frame formed therein with a hole for receiving a wrist of a mechanical hand.

8. A method of producing an industrial robot arm as set forth in claim 7, wherein a rod projecting from said jig is inserted into said hole for receiving the wrist, formed in said reinforcing frame, for positioning.

9. A method of producing an industrial robot arm as set forth in claim 8, wherein leg plates projecting from opposite sides of said reinforcing frame are opposed to opposite side portions of said arm body and a bonding agent and fastening means are applied to portions thus opposed to each other.

10. A method of producing an industrial robot arm as set forth in claim 9, wherein clay blocks are mounted to spaces formed between the end portion of the reinforcing frame and the leg plates of said arm body so as to prevent the bonding agent from flowing away before the solidification.

* * * * *